March 22, 1960
E. G. EWING
2,929,588
ANNULAR RING PARACHUTE
Filed May 15, 1956
2 Sheets-Sheet 1
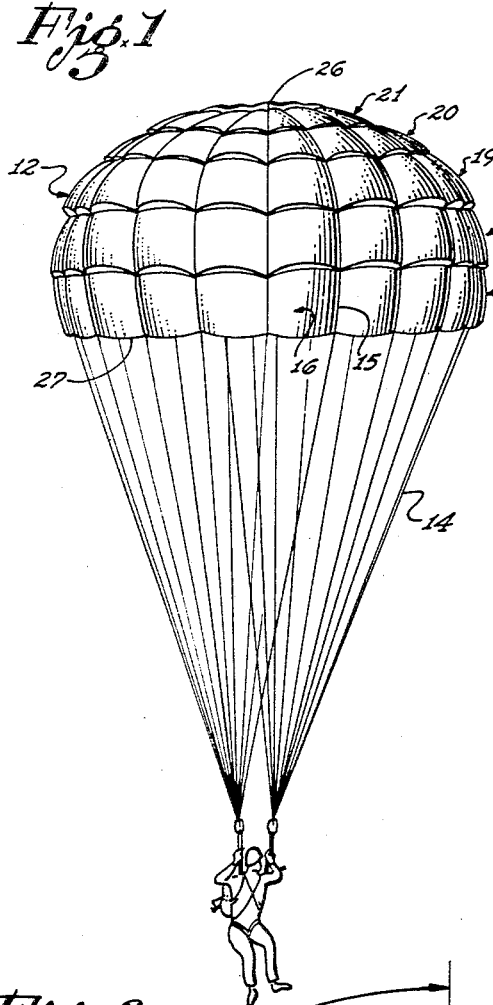
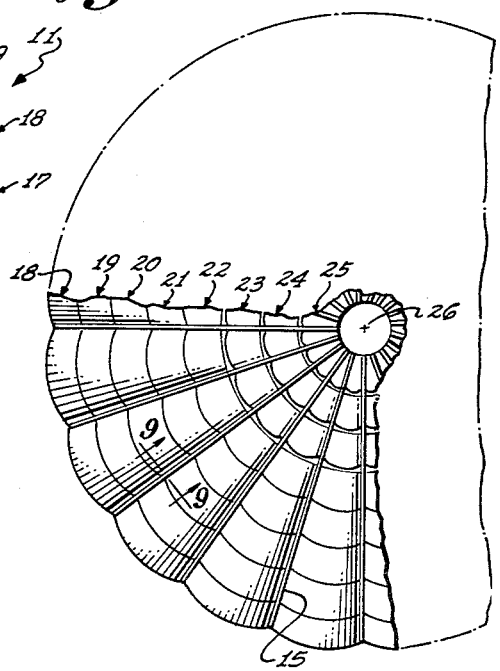
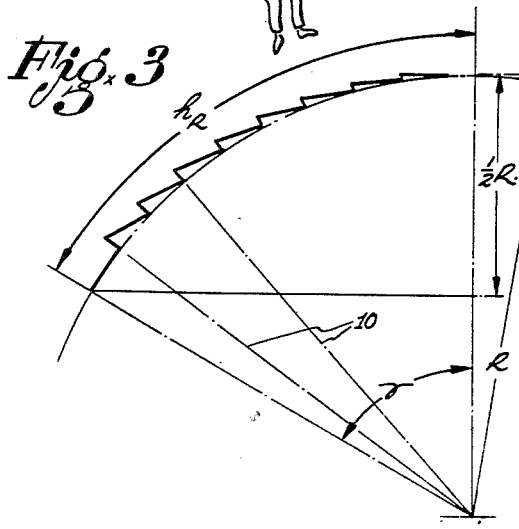
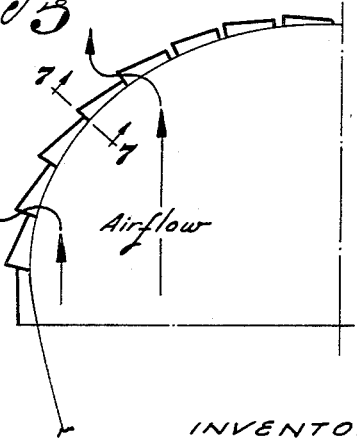
INVENTOR:
Edgar G. Ewing
By Hubert E. Metcalf
His Patent Attorney March 22, 1960 E. G. EWING 2,929,588
ANNULAR RING PARACHUTE
Filed May 15, 1956 2 Sheets-Sheet 2
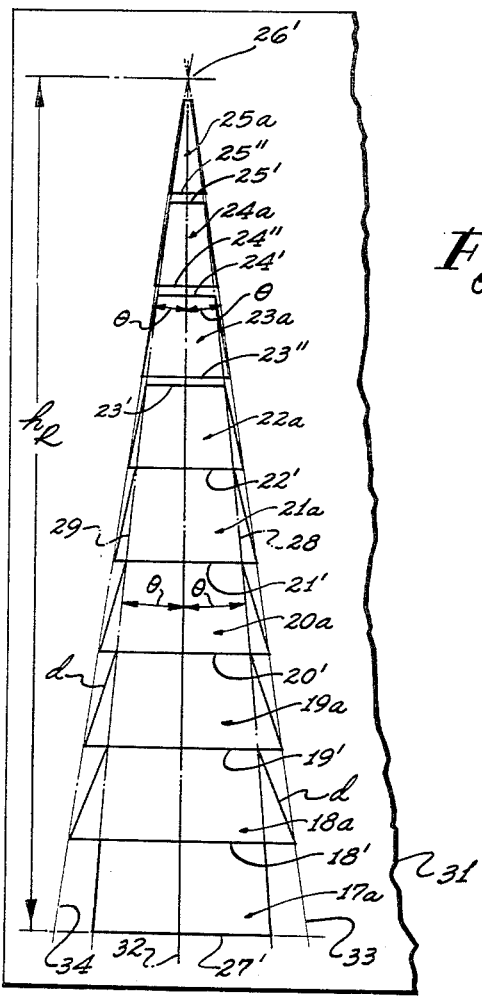
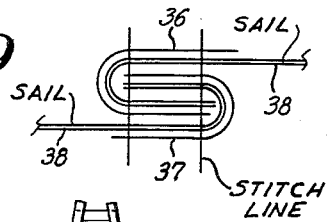
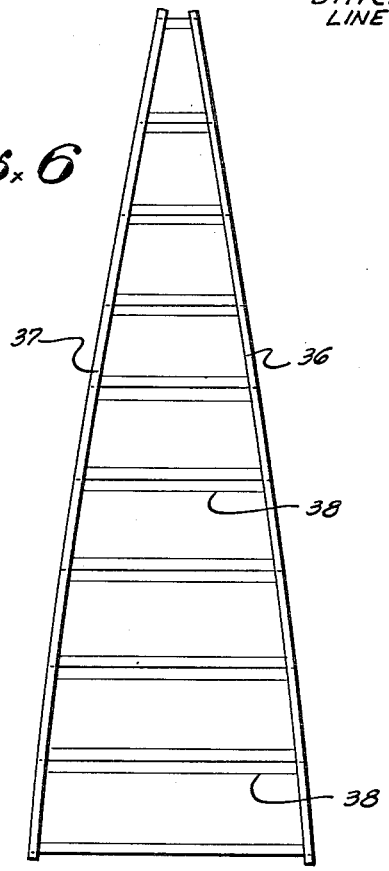
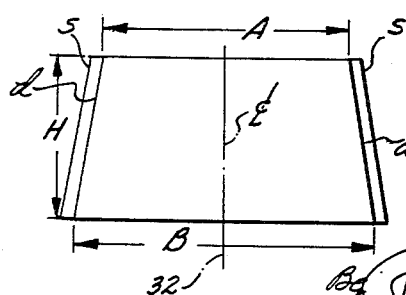
INVENTOR:
Edgar G. Ewing
His Patent Attorney United States Patent Office 2,929,588
Patented Mar. 22, 1960

2,929,588

ANNULAR RING PARACHUTE

Edgar G. Ewing, Sepulveda, Calif., assignor, by mesne assignments, to Northrop Corporation, Hawthorne, Calif., a corporation of California Application May 15, 1956, Serial No. 585,000

6 Claims. (Cl. 244—145)

This invention relates to parachutes and more particularly to parachutes the canopies of which consist of a plurality of concentric sails arranged in a novel manner.

The construction of many prior art parachutes is such that they inherently possess undesirable characteristics especially during the initial inflation and subsequent descent phases of their operation. For example, many parachutes subject their canopies and gear carried thereby to severe shock loads at such time as they initially open. They are extremely unstable during the descent phase of their operation, and if they are not unstable they quite frequently exhibit drag coefficients which are unduly low. Various types of construction have been proposed in an attempt to eliminate or at least alleviate some of the above objectional features. However, such construction in alleviating one or more of these features usually results in other undesirable characteristics of a parachute becoming more pronounced.

It is, therefore, an object of the present invention to provide a parachute in which the force experienced during the initial opening and subsequent inflation period thereof is prolonged and the severity of the opening shock considerably reduced as compared with conventional parachutes.

A further object is to provide a parachute which is extremely stable throughout the descent period thereof so that pendular oscillations are small in amplitude.

A further object is to provide a parachute the novel construction of which provides the parachute with high drag characteristics.

A further object is to provide a parachute having a consistent and positive opening behavior.

The above and other objects of the invention, also various uses and advantages thereof, will manifest themselves as the disclosure progresses and particularly so when considered in connection with thte accompanying drawings forming a part thereof and in which:

Figure 1 is an elevational view of the parachute as disclosed herein in its fully inflated and attitude.

Figure 2 is a partial plan view of the parachute as shown in Figure 1.

Figures 3 and 4 are partial schematic sectional views of the parachute of Figure 1 showing the constructed or basic and inflated profiles thereof, respectively.

Figure 5 shows a developed sector or gore from which the canopy of the parachute of Figure 1 is fabricated.

Figure 6 is an assembled view in plan form of a sector or gore comprising a part of the canopy of Figure 1.

Figure 7 is a sectional view as indicated by the line 7—7 of Figure 4.

Figure 8 is a typical sail pattern developed from the construction of Figure 5.

Figure 9 is a detailed cross sectional view of a typical main seam of the parachute canopy of Figure 1 which is taken at the juncture of a radial and a circumferential tape as indicated by the section line 9—9 in Figure 2.

Referring to the drawings, Figure 1 shows an annulate or ring-vent type of parachute 11 of the type disclosed herein. The parachute as shown in this figure is in a fully inflated attitude such as it assumes during a descent operation thereof. The parachute consists generally of a fabric canopy 12 and a plurality of suspension lines 14 converging below the canopy in a conventional manner to provide supporting means for a person or alternately any type of gear required to be lowered by the parachute.

The canopy 12 is fabricated of a plurality of gores 16 joined along lateral edges thereof. Tapes extending along the lateral edge of each gore provides the canopy with radially extending rib members 15. The construction of the gores 16 will be described in detail as the disclosure progresses. As assembled the gores provide the canopy with a plurality of annular sails identified by the numerals 17 to 25, inclusive, a peak vent 26, and a peripheral edge 27 as best seen in Figures 1 and 2. The individual sail blanks comprising the lowermost sail 17 are of different construction than the individual blanks from which the sails 18—25 are fabricated. The sail 17 is normally referred to as a skirt sail because of its relation with respect to the other annular sails comprising the canopy 12. The difference in construction between the individual sail blanks comprising the sail 17 and the individual blanks comprising the sails 18—25 will be explained in detail as the disclosure progresses. The gores 16 as fabricated and assembled provide the inflated canopy with a saw-tooth like profile having sharp or leading edges pointing downwardly as best seen in Figures 3 and 4. Further the basic shape of the canopy constitutes a quarter sphere rather than a flat disk as is often the case in conventional parachutes. The basic shape of the canopy as mentioned above refers to its constructed or basic shape as shown in Figure 3 and not to its inflated shape as shown in Figure 4. How the gores 16 are developed and fabricated to provide the above mentioned partial spherical basic shape of saw-tooth construction will become apparent from the following description and by referring to Figures 5 and 6.

Assuming it is desired to develop and fabricate a canopy having the relative measurements as indicated in Figure 3 in which the angle $\alpha$ is assumed to be 60°. Construction lines 28 and 29, which define a segment of a sphere of predetermined size, are first laid out on a suitable blank 31, the length of the latter being at least equal to the measurement $h_R$ (Figure 3) and of a width exceeding the greatest lateral measurement of a gore 16. The lines 28 and 29 are those of a quarter sphere of radius R (Figure 3) and are equally spaced respectively on each side of a construction line 32 and diverge from a common point 26', the latter corresponding to the center of the peak vent 26 as shown in Figures 1 and 2. Construction lines 33 and 34 also diverging from the point 26' are located outwardly of the lines 28 and 29, respectively. The number of gores 16 comprising the canopy 12 determines the angles $\theta$ and the divergence of the lines 28 and 29 with respect to the construction line 32. The divergence of the construction lines 33 and 34, with respect to lines 28 and 29, determines the extent of the aforementioned saw-tooth construction as will become apparent as the disclosure progresses.

Base line 27' is now laid out extending in a direction normal to the line 32 and at a distance $h_R$ from the point 26' as measured along the line 32. Transverse construction lines 18' to 25", inclusive, are now constructed and represent the radial extent of the sails 17 to 25, inclusive. In this connection it will be noted that the lines 23'—23", 24'—24", and 25'—25" do not coincide but are spaced apart a slight distance. This slight spacing provides annular vents at such time as the canopy is assembled as seen in Figure 2; however, it is to be understood that the sails 22 to 25, inclusive, may be in adajcent abutting relation if desired. Diagonal construction lines, indicated throughout Figure 5 by the letters d, are laid out to extend respectively between intersections of transverse lines 18', 19' etc. with the lines 28 and 29 and construction lines 33 and 34 as shown in Figure 5.

The individual sails of each gore as shown in Figure 8 are defined by the boundaries thus formed by a pair of diagonals d and two successive parallel construction lines. From these construction lines the sail pattern dimensions A and as shown in Figure 8 are developed. Additional material is provided along the lateral edges of the sail for suitable seam allowances S as shown in Figure 8. The vertical dimension H is generally but not necessarily determined by the woven width of the cloth to be used in the fabrication of the canopy. The foregoing method of development is true of all individual sails except the sail 17a. The lines 28 and 29 determine the transverse edges of the sail 17a.

The transversely extending edges of the individual sails 17a—25a, inclusive, are normally formed by the woven selvedges of the cloth but also may be hemmed or bound with tape 38, both at the top and bottom substantially as shown in Figure 6. Each gore is assembled by binding the different sails together with radial tapes 36 and 37. In executing this operation each individual side edge d is moved in to coincide or define the lines 28 and 29. The transverse edges of the sails are not joined together and so form slit-like openings 39 between adjacent sails in each gore 16 crossed only by radial tapes 36 and 37. This construction provides the gores 16 with the width variation necessary to provide the quarter spherical surface when assembled as shown in Figure 3. The gore assemblies 16 are now joined together along lateral edges by joining respective adjacent pairs of radial tapes 36 and 37 together by means of French fell seams or the like substantially as shown in Figure 9 to provide the rib members 15. In this latter operation it will be noted that the ends of the tapes 38 are rolled together with the respective pairs of tapes 36 and 37 to provide circumferential extending bands. The radial tape pairs 36 and 37 which provide the canopy with the aforementioned rib members 15 are attached to the suspension lines 14 in a conventional manner.

It will now be apparent how the gores 16 in their assembled relationship define the annular sails 17 to 25, inclusive. Further, inasmuch as the lower or leading edge of each individual sail constitutes a greater arc than the top or trailing edge of the individual sail next below it, adjacent annular sails cooperate to define a plurality of crescent shaped vent openings 39 as best seen in Figure 7 which function as air scoops and exhaust ports for air entering or leaving the canopy 12. Thus it will be apparent that the annular sails 17–25, inclusive, assume an average angle of attack which is greater than that of the rings of a simple ring-vent type canopy. This increased angle-of-attack of the annular sails 17 to 25, inclusive, gives the canopy 12 the aforementioned sawtooth like profile having sharp edges pointing downwardly substantially as shown in Figures 3 and 4. It will be seen that the sail edges defining the vent opening 39 lie in planes which are normal to the inner profile surface of the canopy when the latter is in its basic or constructed shape as shown in Figure 3. It will also be seen that the above mentioned planes, that is the planes containing the sail edges defining the vent openings 39, if extended will pass through the spherical center of the canopy with the latter in its basic shape as indicated by the lines 10 in Figure 3.

The type of construction described above causes the parachute 11 to function in a manner fulfilling the many objects of the invention. For example, a parachute as shown in the drawings and constructed as described above has a high degree of stability and at the same time a high drag coefficient as compared with conventional parachutes.

Presumably the above mentioned high drag of the parachute as disclosed herein is induced in the same way and for the same reasons that rough surfaces and abrupt changes of shape increase the drag of solid bodies. The canted position of each of the annular sails 17–25, inclusive, relative to the trailing edge portion of the annular sail next below, gives the outflowing air (indicated by the arrows in Figure 4) a greater radial velocity component which undoubtedly increases the diameter of the turbulent wake of the parachute 11. In steady flow the area of the turbulent wake is a measure of the amount of energy absorbed in resisting the passage of a body through a fluid and hence a measure of the total drag developed.

Further the crescent shaped openings 39 will offer considerable resistance to the steady outflow of air from the canopy 12 due to large interference losses at the sharp corners of the crescent shape openings. This configuration of the openings 39 fortifies the opening tendency of the canopy 12 by increasing the pressure drop across the canopy.

Stability of the parachute 11 is benefited by the tendency of the leading edges of the annular sails 17–25, inclusive, to promote early separation of airflow to limit the size of attached vortices etc. on the canopy 12. The vortices referred to above create a plurality of small airflow disturbances around a canopy. Creating a plurality of small disturbances prevents the growth or occurrence of a single large disturbance of the type which may form in conventional or ring vent type parachutes. The creation of a plurality of small disturbances motivate desirable gliding characteristics and reduce undesirable oscillations of the parachute. Further stabilizing effect of the parachute is due to the geometric porosity of the canopy 12 which promotes equal burbling over the complete canopy. Also the relative area of the openings or geometric porosity of the canopy 12 will effectively reduce the opening shock by prolonging the filling time of the canopy. However, tests have shown that the parachute as disclosed herein exhibits extremely low shock characteristics combined with a positive opening tendency which is unusual.

While in order to comply with the statute, the invention has been described in language more or less specific as to structural features, it is to be understood that the invention is not limited to the specific features shown, but that the means and construction herein disclosed comprises a preferred form of putting the invention into effect, and the invention is therefore claimed in any of its forms or modifications within the legitimate and valid scope of the appended claims.

What is claimed is:

1. In a parachute canopy the combination comprising: a fabric structure of inverted bowl-like configuration developed from a plurality of individual pieces of material; said structure is further characterized in that portions thereof define a peak opening, and a lower peripheral edge and the inner surface thereof, in the developed shape of said structure, constitutes a spherical surface; said structure includes an annular skirt portion and at least one annular upper portion each portion having upper and lower spaced parallel edges; canopy reenforcing means; the adjacent edges of said skirt and upper portions being connected to said reenforcing means only at spaced circumferential points with the lower edge of said upper portion abutting the upper edge of said skirt portion on said reenforcing means without overlap of said portions; as assembled the upper edge of said upper portion and the lower edge of said skirt portion define the peak opening and lower peripheral edge, respectively; and the length of the lower edge of said upper portion exceeds the length of the upper edge of said skirt portion between said spaced points, whereby when said canopy is inflated, said lower edge of said upper portion and upper edge of said lower portion define crescent-shaped openings.

2. In a parachute canopy as set forth in claim 1;

further characterized in that said structure also includes a plurality of gore-like sectors, and the side edges of said gore-like sectors are joined together by means of seams to provide rib members for said canopy.

3. In a parachute canopy as set forth in claim 1: further characterized in that the crescent shaped openings lie in planes which if extended would pass through the center of said spherical surface.

4. In a parachute canopy the combination comprising: a fabric structure of inverted bowl-like configuration developed from a plurality of individual pieces of material; said structure is further characterized in that portions thereof define a vent opening, a lower peripheral edge and the inner surface thereof, in the developed shape of said structure, constitutes a spherical surface; said structure includes upper, lower and intermediate portions each of which is of annular configuration and has upper and lower spaced parallel edges; canopy reenforcing means; the adjacent edges of said upper, lower and intermediate portions being connected to said reenforcing means only at spaced circumferential points with the upper and lower edges of said lower and intermediate portions and with the upper and lower edges of said intermediate and upper portions being in abutting relation on said reenforcing means at said spaced points without overlap of adjacent edges; as assembled the upper edge of said upper portion and the lower edge of said lower portion define said vent opening and lower peripheral edge, respectively; the length of the lower edge of said intermediate portion exceeds the length of the upper edge of said lower portion between said spaced points; and the length of the lower edge of said upper portion exceeds the length of the upper edge of said intermediate portion between said spaced points, whereby when said canopy is inflated, the lower and upper edges of said upper and intermediate portions and the lower and upper edges of said intermediate and lower portions cooperate to define two distinct annular rows of crescent-shaped openings.

5. In a parachute canopy as set forth in claim 4: further characterized in that said structure also includes a plurality of gore-like sectors the side edges of which are joined together to provide seams which constitute rib members for said canopy.

6. In a parachute canopy as set forth in claim 4: further characterized in that said crescent shaped openings lie in planes which if extended would pass through the center of said spherical surface.

References Cited in the file of this patent

UNITED STATES PATENTS

| 1,562,258 | Russell | Nov. 17, 1925 |
| 2,358,233 | Jorgensen | Sept. 12, 1944 |

FOREIGN PATENTS

| 175,780 | Great Britain | Feb. 28, 1922 |